UNITED STATES PATENT OFFICE.

PHILIPP OTT AND FRANZ VOLGER, OF ELBERFELD, GERMANY, ASSIGNORS TO THE FARBENFABRIKEN OF ELBERFELD COMPANY, OF NEW YORK.

BROWN AZO DYE AND PROCESS OF MAKING SAME.

SPECIFICATION forming part of Letters Patent No. 658,507, dated September 25, 1900.

Application filed December 28, 1899. Serial No. 741,849. (Specimens.)

*To all whom it may concern:*

Be it known that we, PHILIPP OTT and FRANZ VOLGER, doctors of philosophy, chemists, (assignors to the FARBENFABRIKEN OF ELBERFELD COMPANY, of New York,) residing at Elberfeld, Germany, have invented a new and useful Improvement in Brown Azo Dyes; and we hereby declare the following to be a clear and exact description of our invention.

Our invention relates to the production of valuable new brown monoazo dyestuffs by combining the diazo derivatives of picramic acid of the formula

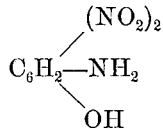

with certain derivatives of metadiamidosulfonic acids of the benzene series—such as the monomethyl, monoethyl, monobenzyl derivatives thereof—having the general formula

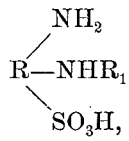

(R meaning a radical of a hydrocarbon of the benzene series—such as benzene, toluene, or the like—$R_1$ meaning an alkyl radical, such as methyl, ethyl, benzyl, or the like.) The new dyestuffs thus obtained are alkaline salts of acids, having the general formula

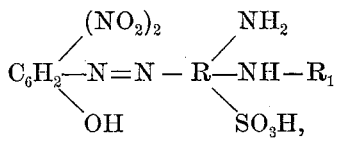

in which R means one of the above-defined hydrocarbon radicals of the benzene series and $R_1$ an alkyl radical, such as methyl, ethyl, benzyl, or the like. They are dark powders soluble in water with a brownish-red color and dye unmordanted wool in acid-baths in general from reddish-brown to brown shades, which by a subsequent treatment with solutions of chromium compounds, such as potassium bichromate or the like, are changed into fast and deep-brown shades.

It may be remarked that the above-mentioned alkylated metadiamidosulfonic acids of the benzene series, such as monomethyl-metaphenylenediaminsulfonic acid or the like, can be prepared by the action of an halogen alkyl—such as methyl iodid, ethyl iodid, benzyl chlorid, or the like—on the said metadiamidosulfonic acids of the benzene series.

In carrying out our new process practically we can proceed as follows, the parts being by weight: 19.9 parts of picramic acid are dissolved in six hundred parts of hot water, with the addition of 8.5 parts of ammonia liquor (containing twenty per cent. of $NH_3$.) After cooling it is diazotized in the known manner with the aid of seven parts of sodium nitrite and a suitable quantity of hydrochloric acid. The diazo derivative which separates during this operation is isolated by filtration and then stirred into a solution which has been prepared from two hundred parts of water, 13.6 parts of sodium acetate, and 22.4 parts of the sodium salt of monomethylmetaphenylenediaminsulfonic acid (which has been produced by the action of one molecule of methyl iodid on one molecule of the sodium salt of metaphenylenediamin sulfonic acid.) The mixture thus obtained is further stirred for about twelve hours. Subsequently it is heated to about 80° centigrade and then mixed with a suitable quantity of common salt. Finally, the dyestuff thus separated is filtered off, pressed, dried, and pulverized.

The new coloring-matter represents a dark powder of a metallic luster, soluble in water with a brownish-red color. It is the sodium salt of an acid having the formula:

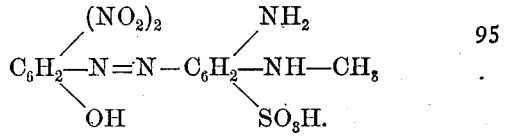

By concentrated sulfuric acid (of 66° Baumé)

it is dissolved, yielding a dark-red solution, the color of which changes into reddish brown on the addition of a small quantity of ice, while a reddish-brown precipitate is separated therefrom on adding a larger quantity of ice. It is also soluble in ammonia with a brownish-red color, in alcohol with a dark-brown color.

The new dyestuff yields on unmordanted wool in acid-baths reddish-brown shades, which by a subsequent treatment with potassium bichromate are changed into deep-brown shades, fast to milling and to light.

Very similar results are obtained if instead of the monomethylmetaphenylenediaminsulfonic acid other of the above-defined dyestuff components are used.

Having now described our invention and in what manner the same is to be performed, what we claim as new, and desire to secure by Letters Patent, is—

1. The process for producing new monoazo dyestuffs by first combining the diazo derivatives of picramic acid with certain derivatives of metadiamido sulfonic acids of the benzene series having the formula:

R meaning a radical of a hydrocarbon of the benzene series, $R_1$ an alkyl radical, secondly isolating the dyestuffs thus obtained substantially as hereinbefore described.

2. The process for producing a new monoazo dyestuff by first combining a diazo derivative of picramic acid with monomethylmetaphenylenediaminsulfonic acid, secondly isolating the dyestuff thus produced, substantially as hereinbefore described.

3. The herein-described new monoazo dyestuffs, being alkaline salts of acids having the formula

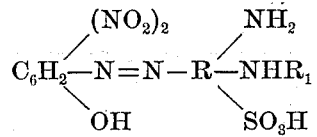

R meaning a radical of a hydrocarbon of the benzene series, $R_1$ meaning a radical of the fatty series, which dyestuffs are when dry and pulverized dark powders, soluble in water with a brownish-red color, dyeing unmordanted wool in acid-baths from reddish-brown to brown shades which by a subsequent treatment with solutions of potassium bichromate are changed into fast and deep-brown shades, substantially as hereinbefore described.

4. The herein-described specific dyestuff being an alkaline salt of the acid having the formula:

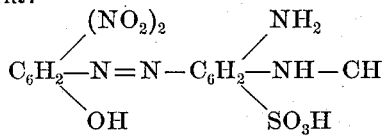

which is a dark bronzy-colored powder, soluble in water with a brownish-red color, soluble in concentrated sulfuric acid with a dark-red color which turns into reddish brown on adding a small quantity of ice while a reddish-brown precipitate is obtained on the addition of a larger quantity of ice to the sulfuric-acid solution, soluble in alcohol with a dark-brown color, in ammonia with a brownish-red color, dyeing unmordanted wool in acid-baths reddish-brown shades which by a subsequent treatment with a solution of potassium bichromate are changed into deep-brown shades fast to milling and to light, substantially as hereinbefore described.

In testimony whereof we have signed our names in the presence of two subscribing witnesses.

PHILIPP OTT.
FRANZ VOLGER.

Witnesses:
OTTO KÖNIG,
J. A. RITTERSHAUS.